(12) United States Patent
Ickman et al.

(10) Patent No.: US 11,170,174 B2
(45) Date of Patent: Nov. 9, 2021

(54) CONVERSATIONAL AI USING ADAPTIVE DIALOGS

(71) Applicant: Microsoft Technology Licensing, LLC, Redmond, WA (US)

(72) Inventors: Steven Wayne Ickman, Snoqualmie, WA (US); Thomas Matthew Laird-McConnell, Kirkland, WA (US); Christopher Clayton McConnell, Redmond, WA (US); Carlos Castro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 16/437,906

(22) Filed: Jun. 11, 2019

(65) Prior Publication Data
US 2020/0394268 A1    Dec. 17, 2020

(51) Int. Cl.
*G06F 17/00*      (2019.01)
*G06F 40/30*      (2020.01)
*G06N 3/00*       (2006.01)
*G06F 40/295*     (2020.01)
*G06F 8/30*       (2018.01)

(52) U.S. Cl.
CPC ............ *G06F 40/30* (2020.01); *G06F 40/295* (2020.01); *G06N 3/004* (2013.01); *G06F 8/30* (2013.01)

(58) Field of Classification Search
USPC .......................................................... 709/9
See application file for complete search history.

(56) References Cited

U.S. PATENT DOCUMENTS

| | | | |
|---|---|---|---|
| 9,311,298 B2 | 4/2016 | Sarikaya et al. | |
| 10,162,814 B2* | 12/2018 | Jiao | G06F 3/167 |
| 10,261,774 B2* | 4/2019 | Chatterjee | G06F 11/3664 |
| 10,387,463 B2 | 8/2019 | Campbell et al. | |
| 10,424,302 B2 | 9/2019 | Shah et al. | |
| 10,498,673 B2 | 12/2019 | Zhang et al. | |

(Continued)

OTHER PUBLICATIONS

"Non Final Office Action Issued in U.S. Appl. No. 16/437,856", dated Feb. 19, 2021, 9 Pages.

(Continued)

*Primary Examiner* — Satwant K Singh
(74) *Attorney, Agent, or Firm* — Holzer Patel Drennan

(57) ABSTRACT

A computer-executed conversational system utilizing adaptive dialogs to provide dynamic modification of a conversation structure. The adaptive dialogs facilitate an adaptive and dynamic way to model conversations. A conversational rule may be associated with a trigger received at an adaptive dialog. The conversational rule may populate a plan with steps to provide the conversational structure of the conversational system. Modifying triggers may be received that allow conversational rules to amend the plan including adding steps, removing steps, or modifying steps from the plan. The adaptive dialogs and/or components thereof may be provided as constructible elements in a platform for building a bot such as a developer Software Development Kit (SDK) or the like. In turn, sophisticated conversational modeling may be conveniently facilitated to provide features such as a dialog dispatcher, the ability to handle interruptions, and to build a pluggable, extensible conversational system.

23 Claims, 7 Drawing Sheets

(56) References Cited

U.S. PATENT DOCUMENTS

| | | |
|---|---|---|
| 10,740,370 B2 | 8/2020 | Campbell et al. |
| 2018/0189266 A1* | 7/2018 | Venkataraman ........ G06F 40/35 |
| 2019/0115027 A1 | 4/2019 | Shah et al. |
| 2019/0317994 A1* | 10/2019 | Singh ..................... G06N 20/00 |
| 2020/0394272 A1 | 12/2020 | Ickman et al. |
| 2021/0110822 A1* | 4/2021 | Pramanick ............. B25J 9/1661 |

OTHER PUBLICATIONS

"Notice of Allowance Issued in U.S. Appl. No. 16/437,856", dated Jun. 25, 2021, 9 Pages.

\* cited by examiner

CONVERSATIONAL AI USING ADAPTIVE DIALOGS

CROSS-REFERENCE TO RELATED APPLICATIONS

The present application is also related to U.S. patent application Ser. No. 16/437,856 filed Jun. 11, 2019, entitled "CONVERSATIONAL EVENT MODELING" which is filed concurrently herewith and is specifically incorporated by reference for all that it discloses and teaches.

BACKGROUND

Computer-based conversational systems have increasingly changed the manner in which users interact with computers. For instance, tasks previously performed using traditional user interfaces in which a user interacts with user interface elements such as menu structures, forms, and the like (e.g., using a mouse, keyboard, display, touchscreen, etc.), are being replaced with conversational interfaces that allow a user to provide inputs to a computing system in a manner akin to speaking to a human assistant.

Conversational bots (or simply bots) have provided significant advances to facilitate such new conversational interaction with computers. Bots may allow a user to interact with a computing system (e.g., an operating system, applications, webpages, etc.) by providing inputs in a conversational manner using text, interactive cards or images, or speech.

Additionally, tools have been provided to assist in the generation of bots including, for example, Azure Bot Service available from Microsoft Corporation. For example, such tools may be provided in the form of a Software Developer Kit (SDK) that provide software tools, templates, or other modularly functional units to allow a developer to develop a bot for a given interaction with a user.

SUMMARY

A method of dynamically modifying a conversation structure of a computer-executed conversational system executed by one or more processors using an adaptive dialog. The method includes recognizing a trigger by an adaptive dialog recognizer of the adaptive dialog and identifying a conversational rule of the adaptive dialog that is associated with the trigger. The method also includes launching a plan by the computer-executed conversational system, the plan being populated with a sequence of one or more steps for the conversational rule. The method also includes commencing execution of the sequence of one or more steps of the plan by the one or more processors of the computer-executed conversational system.

The plan may be dynamically modified by the adaptive dialog. Accordingly, the method also includes receiving a modifying trigger during an active step in the sequence of one or more steps, where the modifying trigger is associated with another conversational rule. The method also includes amending the plan based on the modifying trigger at least to add a step to the plan or remove a step from the plan in any location within the sequence of one or more steps of the plan. Other aspects include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
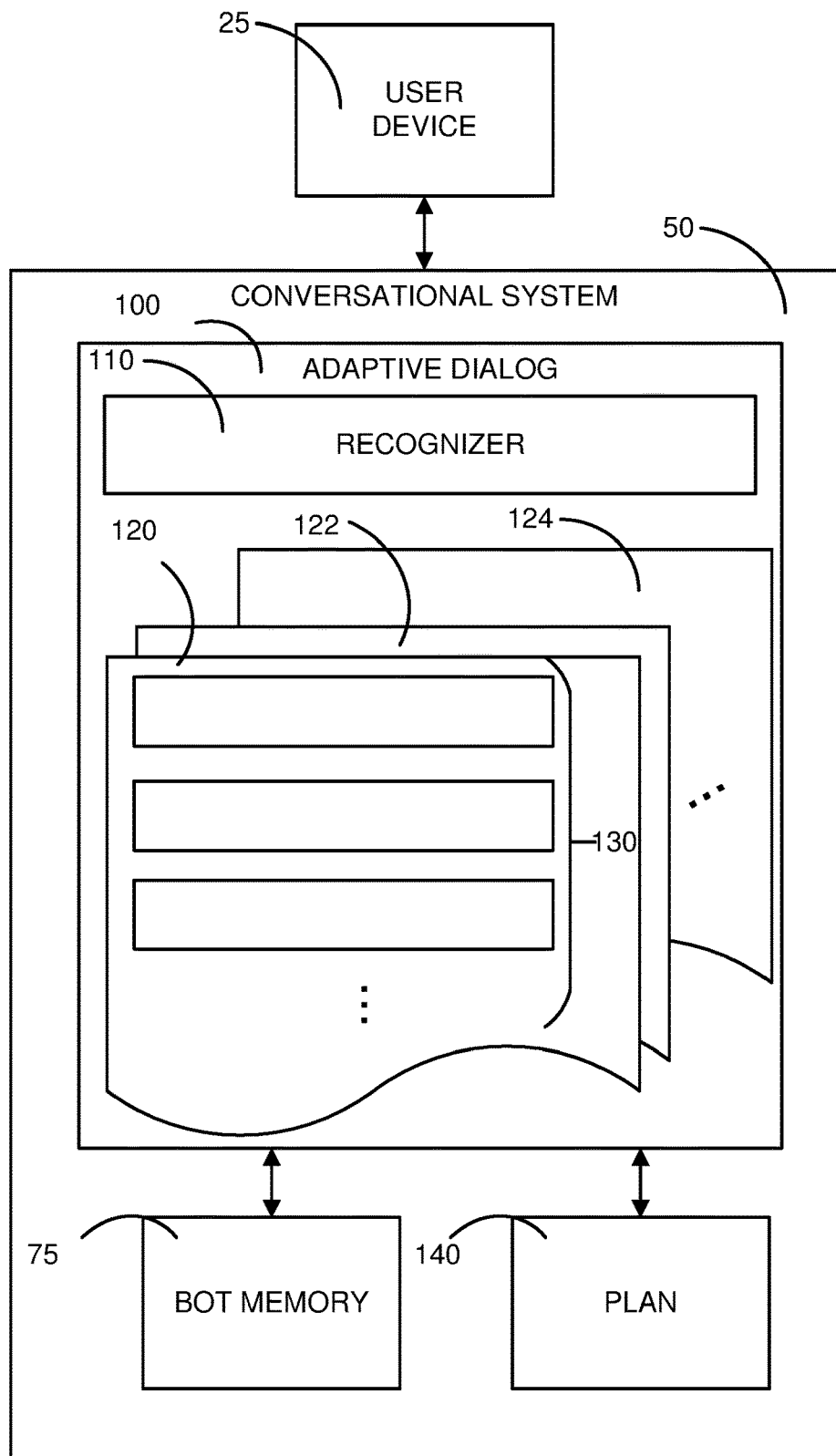
FIG. 1 illustrates an example conversational system including an adaptive dialog for generating a conversation structure.

As computer-executed conversational bots, or simply bots, become more common place for facilitating conversational interaction with computing devices, there exists a need to improve such interfaces to provide a robust, human-like conversational quality. Many current approaches to the development and functioning of bots provides a rote conversation structure in which bots, in effect, follow a script that has a rigid, predefined conversational structure. In turn, improvisations, tangents, asides, interruptions, or other common human conversation characteristics are not capable of being processed by such prior bot approaches. Such shortcomings often result in user frustration. Additionally, the limitations of prior bots may preclude a user from achieving a desired function that is attempted to be provided by a bot.

Accordingly, the present disclosure contemplates a dynamic conversational structure of a computer-executed conversational system. Specifically, the present disclosure presents an adaptive dialog, which may provide dynamic adjustment or amendment of a conversational structure or plan that facilitates adaptation of a bot to the context of a conversation. This may be of particular use when, as often happens, a user does not provide information in an order or format expected by a bot or provides a tangential or otherwise unrelated thought or request that is not relevant to the current conversation or dialog.

An aspect of the present disclosure provides a modular platform for generation and arrangement of dialog components in an SDK. This may allow developers to more easily build bots that have advanced conversational structures without requiring extensive coding to facilitate sophisticated conversation modelling concepts such as building a dialog dispatcher, handling interruptions, and building a pluggable, extensible dialog system. In this regard, the adaptive dialogs, or at least components thereof, may be provided as declarative file components to allow for simple manipulation and structuring of the adaptive dialog by a developer.

The approaches described in the present disclosure may also leverage other tools or approaches for conversational systems. For instance, the presently disclosed adaptive dialogs may support or be structured for compatibility with a rich event system. This may allow for robust modelling and processing of interruptions, cancellation, and execution planning semantics. Accordingly, input recognition, event handling via rules, modelling of the conversation structure, and output generation are provided as a cohesive, self-contained unit, which may be accessible in an SDK for use in building a bot.

The present disclosure also supports extensibility of the adaptive dialogs in a number of respects. For instance, the adaptive dialog of the present disclosure may be extensible with respect to recognition, event rules, and machine learning, such that improved approaches to any such aspect may be easily extended for integration with the dynamic conversation structure facilitated by the adaptive dialogs.

In turn, the adaptive dialog of the present disclosure facilitates a new way to model conversations to simplify modelling primitives such as building a dialog dispatcher or providing interruption handling. The adaptive dialogs may be declarative and extensible to allow for modular assembly and manipulation of conversations for a bot, while also allowing easy adaptation for future development of ancillary conversation tools. The result facilitated by the adaptive dialogs is a robust way for developers to provide and execute conversational bots that provide dynamic conversational structure that adapts to the context of a conversation with a user without requiring extensive custom coding. In turn, developers may provide more focus on the model of a conversation for a bot that provides a more robust, productive, and fulfilling interaction with a user.

FIG. 1 depicts an example of a conversational system 50. The conversational system 50 may be in operative communication with a user device 25. In turn, the conversational system 50 may facilitate interaction with a user via the user device 25. The user device 25 may be any appropriate computing device such as a mobile device, a laptop computer, a desktop computer, a smart speaker, an Internet-of-Things (IoT) smart device, a digital assistant device, or any other appropriate computing device with which a user may interact. The user device 25 may be in communication with the conversational system 50 using any appropriate means including, for example, a local connection, a connection via a network interface, or the like. Alternatively, the conversational system 50 may reside and be inexecutable locally on the user device 25.

The conversational system 50 may include and/or execute an adaptive dialog 100. The adaptive dialog 100 may include a recognizer 110, one or more conversational rules 120, and one or more steps 130. The one or more steps 130 may be associated with a given conversational rule 120. In addition, any or all of the steps 130 may comprise a dialog, thus enabling a hierarchical, tiered, or multilevel dialog structure.

The conversational system 50 may include a bot memory 75 for storing and tracking conversations (e.g., data corresponding to inputs, states, or the like) with a user of the user device 25. The bot memory 75 may be implemented as any type of computer readable storage media, including volatile or non-volatile memory. The conversational system 50 may be executed on any appropriate computing device described in greater detail below.

The recognizer 110 is operative to extract data from input received at the adaptive dialog 100. For instance, the recognizer 110 may receive an input and may generate an output that reflects the input in a form or schema that may be processible by the adaptive dialog 100. The output of the recognizer may comprise a trigger. A trigger output by the recognizer 110 may be treated as an event received at the adaptive dialog 100. For instance, the recognizer 110 may receive an input from a user in the form of speech, typed text, or another user input. The recognizer 110 may process the input to output the trigger. The trigger may comprise an intent recognized by the recognizer 110 from the input and/or an entity recognized by the recognizer 110 from the input.

A trigger may also comprise an event received at the adaptive dialog 100. For instance, certain components of the conversational system 50 may emit events in association with the execution of the component. For instance, other dialogs may emit events to the adaptive dialog 100, which may be processed by the adaptive dialog as a trigger. The other dialogs 100 may be concurrently executing dialogs or dialogs comprising steps being performed in the execution of the adaptive dialog 100. System events may be provided such as events that are emitted when a dialog is started; when a new activity is received; when an intent is recognized (e.g., by the recognizer 110); when an intent is not handled, recognized, or expected; when a plan is started; when a plan is saved; when a plan ends; when a plan is resumed from an interruption; when a consulting occurs; and/or when a dialog is cancelled. Events may also be extensible such that developers may generate or customize events and/or event handling by the adaptive dialog 100.

The adaptive dialog 100 may also include one or more conversational rules 120. Conversational rules 120 may be consulted when a trigger (e.g., a system event or other output is emitted from the recognizer 110) are received at the adaptive dialog 100. Conversational rules 120 may comprise a condition that, when satisfied, calls the conversational rule 120 for execution by the adaptive dialog 100. The conversational rule 120 may include one or more steps 130 to execute when the conversational rule is called by the adaptive dialog 100. That is, when the condition of a conversational rule 120 is satisfied, the steps 130 of the rule may be added to a plan 140 of the conversational system 50 to be executed by the conversational system 50 for interaction with the user device 25. The plan 140 may reflect a conversational structure for the conversational system 50, which may be dynamically modified by the adaptive dialog 100 as described below.

When a trigger is received at the adaptive dialog 100, the trigger may be used to identify a conversational rule 120 in the adaptive dialog 100 that is associated with the trigger (e.g., has a condition satisfied by the trigger). A dialog 100 may include a plurality of rule 120, 122, 124, etc. While three rules are depicted in FIG. 1, additional or fewer conversational rules may be provided for a dialog 100 without limitation. In this regard, conversational rules 120, 122, and/or 124 may define how the adaptive dialog 100 executes in reaction to a trigger. For instance, a conversational rule 120, 122, and/or 124 may be associated with a specific event that is emitted by any sub-system. Other conversational rules 120, 122, and/or 124 may be associated with respective intents and/or entities that may be recognized by the recognizer 110. For instance, an intent "bookFlight" may be output from the recognizer 110 from a user's statement "help me book a flight." A conversational rule 120 associated with the intent "bookFlight" may be identified in response to receipt of the intent "bookFlight." Additionally or alternatively, conversational rules 120, 122, and/or 124 may be associated with entities. For instance, when an input of "when is Mom's birthday?" is received, the recognizer 110 may determine an entity "Mom" associated with the user's mother (e.g., from the user's contacts). Identification of the entity "Mom" may be associated with a conversational rule 122 that may execute when the entity "Mom" is recognized. Other associations between conversational rules 120, 122, and/or 124 and intents, entities, or events may be provided without limitation.

Conversational rules 120, 122, and/or 124 may include steps 130, such that when a rule is called or invoked (e.g., by satisfaction or matching of a condition for the conversational rule 120), the steps 130 for the conversational rule 120 may be added to the plan 140 maintained by the conversational system 50. While conversational rule 120 is shown as including three steps 130, additional or fewer steps 130 may be provided without limitation. Moreover, different conversational rules 120, 122, and/or 124 may include a different number of steps. Accordingly, conversational rule 120, 122, and/or 124 may include one or more steps 130. Steps 130 comprise dialog primitives that may be used to control the flow of the conversation system 50. Specifically, steps 130 may provide certain defined functionality. Examples of functionality facilitated by a step 130 may include, but are not limited to, sending a response, tracing and logging actives, memory manipulation, conversational flow and dialog management, eventing, or custom defined functionally, which may be extensible. A step 130 may send a response by facilitating the ability to send an activity to a user. The activity can be a string or an object. A step 130 may provide tracing and logging activities by facilitating a declarative step used to emit a trace that gets routed as a transcript to provide logging for the bot executing the adaptive dialog 100 in the conversational system 50. A step 130 may provide memory manipulation by facilitating a declarative or a set of declaratives that allow manipulation of a bot's memory. For instance, a step 130 may be used to save a memory property as an entity, edit an array in memory, initial a property to either an object or an array, set memory to the value of an expression, remove a property from memory, or perform some other action in relation to the memory for the bot.

Steps 130 may also provide conversational flow and dialog management. That is, steps 130 may control the flow of a given set of steps (e.g., within a plan of the conversational system 50). For instance, a step 130 may be provided that facilitates inspection of memory and can branch between dialogs based on a condition evaluated relative to the memory. A step 130 may conditionally determine which of a plurality of steps 130 to execute next (e.g., after completion of a prior step). A step 130 may be used to begin another dialog. As will be described in greater detail below, this may allow a dialog (e.g., the adaptive dialog 100) to launch one or more sub-dialogs or children dialogs that may execute to add steps 130 to the plan 140 of the conversational system 50. In some examples, upon completion of a child dialog called by a parent dialog, execution may return to the parent dialog that called the child dialog to begin. A parent dialog may receive an input that causes a child dialog or intervening dialog to launch. Upon completion of the child dialog or intervening dialog, the parent dialog may resume execution. In other examples, flow of the plan may be otherwise manipulated to define a sequence of steps 130 in the plan. A step 130 may be provided to end a dialog. In this case, upon ending a dialog, a result may be returned to a parent or calling dialog. Another step 130 may be provided to cancel all dialog steps. For instance, such a step may emit an event that propagates through an entire dialog stack to cancel all current dialogs (e.g., any active dialog that has commenced, but not completed). Conditions may be placed on the propagation of the cancellation event emitted by such a step to allow for selective cancellation of certain active dialogs (e.g., at a given level in a dialog hierarchy or the like). Also, a step 130 may be used to replace a step 130 with another step 130. Upon replacement of a step 130, the step 130 replacing the existing step 130 may bind its result to memory. Steps 130 may also provide extensibility such as allowing for execution of custom code or making other appropriate calls (e.g., HTTP calls, API calls, or the like).

Furthermore, steps 130 may be used for obtaining an input or model interactions with a user. For instance, a step 130 may prompt a user for an input. The prompted input may comprise a text input, an integer input, a floating point input, a choice of one or more options presented, and/or a confirmation of an input (e.g., providing a yes/no choice to the user to confirm a prior input).

Figure 2:
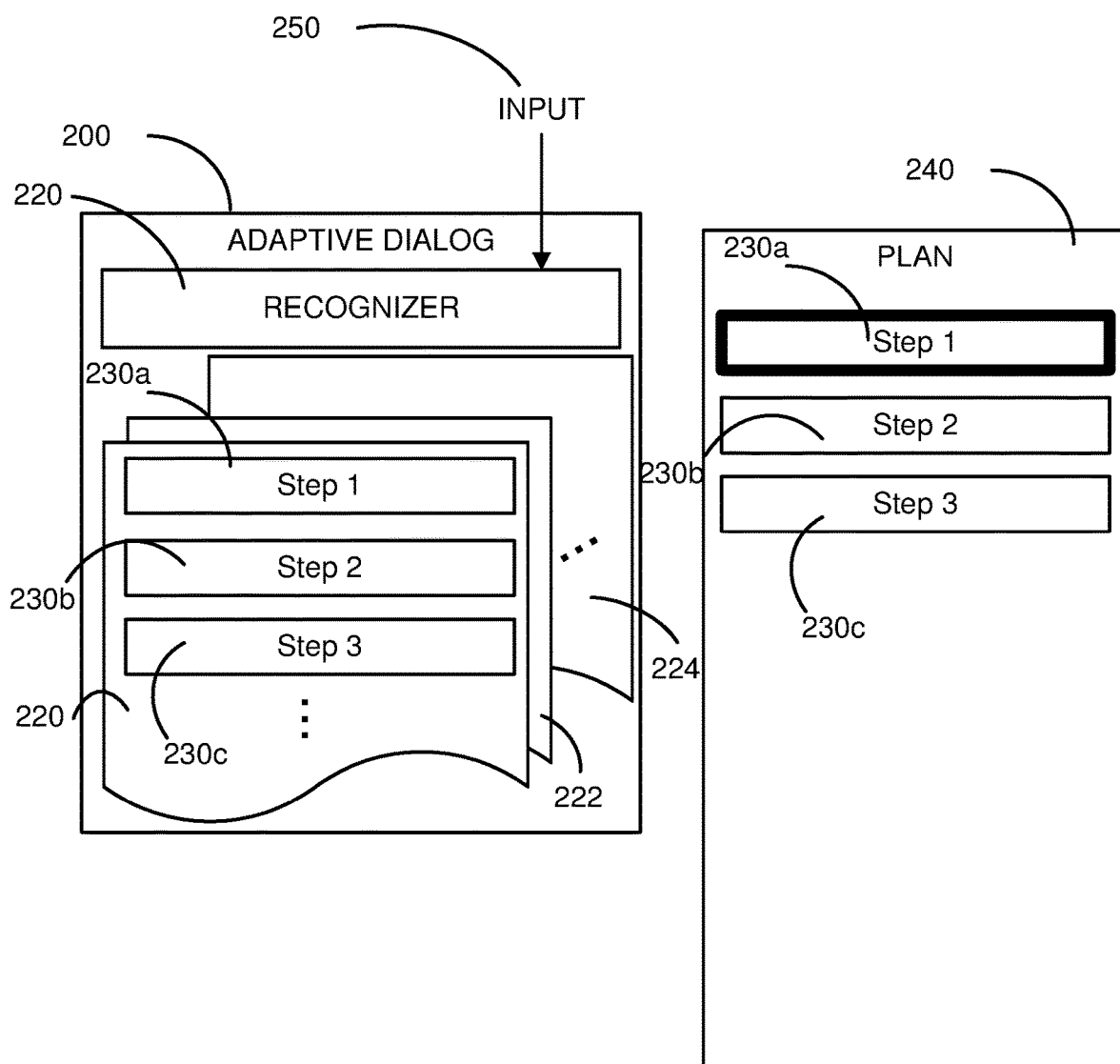
FIG. 2 illustrates an example adaptive dialog for generating a conversation structure of a conversational system by adding steps to a plan for the conversational system.

As briefly referenced above, upon satisfaction of a condition of a conversational rule 120, 122, and/or 124 (e.g., in response to a trigger), the steps 130 for the conversational rule 120 may be added to a plan 140. With further reference to FIG. 2, interaction between a conversational rule 220 and a plan 240 is illustrated. FIG. 2 includes a plan 240, which may exist in memory of a conversational system. As can be appreciated, an input 250 may be provided to a recognizer 210 of an adaptive dialog 200. The input 250 may be a typed string, speech, utterance, or other input provided by the user (e.g., via a user device). In turn, a conversational rule 220 may be identified based on a trigger generated by the recognizer 210 in response to the input 250. For instance, an intent and/or entity may be emitted by the recognizer 210 in response to the input 250. In turn, a conversational rule 220 with a condition associated with receipt of the intent and/or entity may be identified. In turn, Step 1 230*a*, Step 2 230*b*, and Step 3 230*c* for the conversational rule 220 may be added to (e.g., may populate) the plan 240. Also, the conversational system may commence execution of the plan 240 by commencing to perform the functionality of Step 1 230*a*. That is, Step 1 230*a* may be made the active step, as evidenced by the bold outline in FIG. 2. The plan 240 may comprise a sequence of steps 230*a*, 230*b*, 230*c* that are queued to be performed by the adaptive dialog 200. However, as will be appreciated in greater detail below, the adaptive dialog 200 may dynamically amend the plan 240 in response to various triggers (e.g., referred to herein as modifying triggers) received during the execution of a given step 230 in the plan 240.

Figure 3:
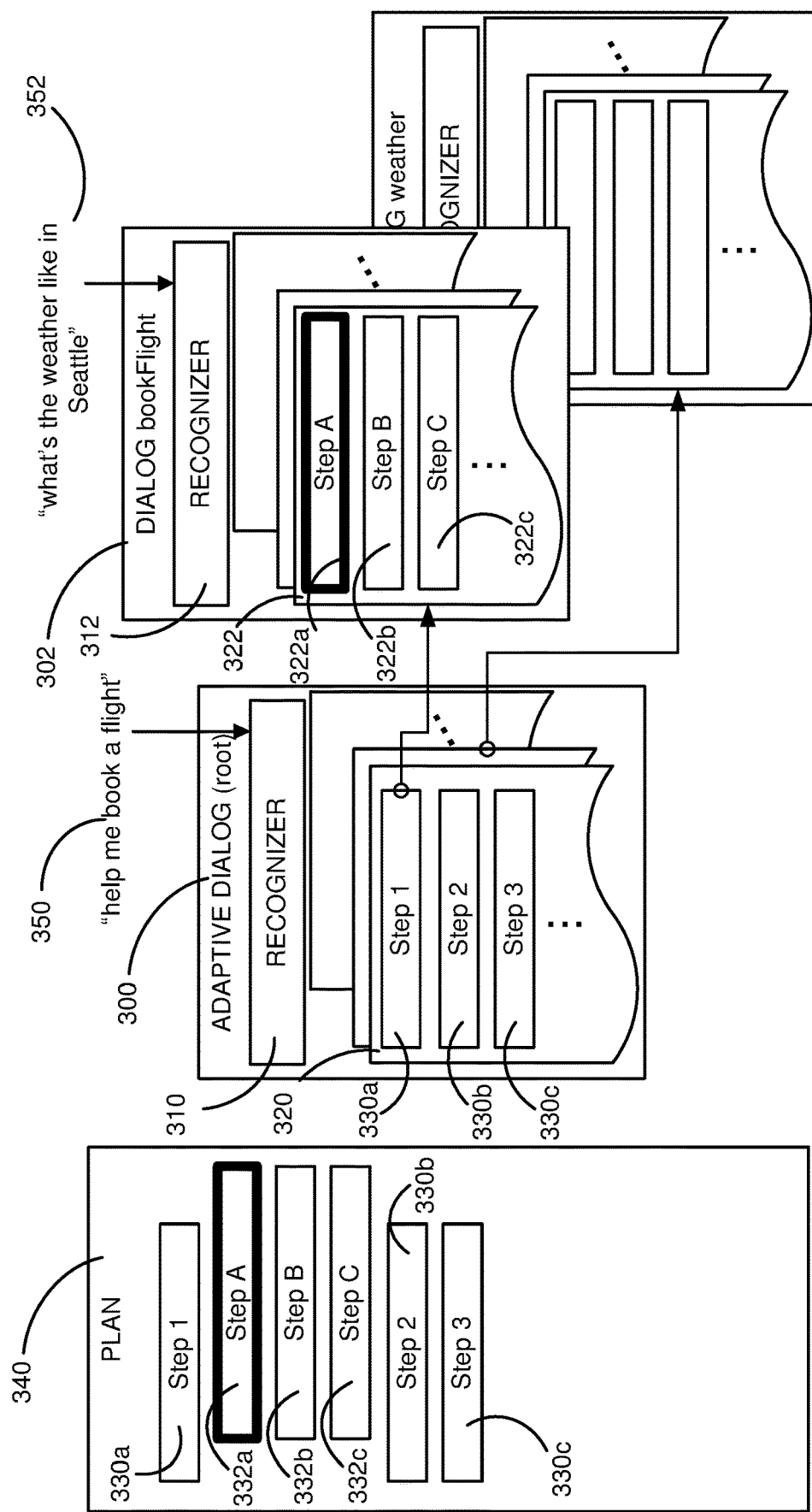
FIG. 3 illustrates an example of a hierarchical dialog structure facilitated by an adaptive dialog for dynamic control of a plan for the conversational system.

With further reference to FIG. 3, a hierarchical dialog structure is depicted. In FIG. 3, a plan 340 that may be maintained in a memory of a conversational system is shown. A root adaptive dialog 300 may be provided for the conversational system. The adaptive dialog 300 may include one or more conversational rules 320. The conversational rule 320 may include one or more steps 330*a*, 330*b*, and/or 330*c*. Any one or more steps 330 in a conversational rule 320 may itself comprise a dialog. In this regard, a child dialog 302 may be called upon execution of step 330*a*. The child dialog 302 may include a conversational rule 322. For instance, the conversational rule 322 may be triggered or called from the root dialog 300 during execution of step 33*a*. That is, execution of a step 330 may include launching a child dialog. In turn, multiple levels of dialogs (e.g., dialog 300, 302, etc.) may be provided as dialogs are launched upon execution of a step 330 from a parent dialog. In this regard, a root dialog 300 (e.g., an adaptive dialog) may include Step 1 330a, Step 2 330b, and Step 3 330c, which are added to the plan 340 upon execution of a conversational rule 320 of the root dialog 300. As discussed above, the plan 340 may be amended in response to various triggers as will be described below.

As an example, during Step 1 330a of the root dialog 300. An input 350 of "help me book a flight" may be received. The input 350 may be processed by a recognizer 310 to recognize an intent from the input 350. For instance, the intent may be identified as "bookFlight." This may comprise a trigger comprising the intent "bookFlight." In turn, conversational rule 322 may comprise an intent rule for the trigger "bookFlight." The conversational rule 322 may comprise Step A 332a, Step B 332b, and Step C 332c, which may facilitate an interface with a user device that allows a user to book a flight. As such, the trigger identified by the recognizer 310 from the input 350 may result in identification of rule conversational 322 related to "bookFlight." In turn, the steps 322 for the "bookFlight" conversational rule 322 may be added to the plan 340.

The amendment of the plan 340 by a conversational rule 322 may allow the plan 340 to be amended in any appropriate manner. Non-limiting examples may include that steps 322 may be added to the beginning of a plan 340 (e.g., prior to all other steps 330 currently populated in the plan 340), may be added to the end of a plan 340 (e.g., subsequent to all other steps 330 currently populated in the plan 340), may be added between existing steps 330 in the plan, or may replace one or more steps 330 that exist in the plan 340. Also, as described in greater detail below, steps 330 or 332 for a conversational rule 320 or 322 may be treated collectively (e.g., inserted into a plan as a block of steps) or individually.

Continuing the example of FIG. 3, upon identification of the "bookFlight" conversational rule 322 based on the input 350, Step A 332a, Step B 332b, and Step C 332c may be added to the plan 340 between step 1 330a and step 2 330b. While all steps for the "bookFlight" conversational rule 322 are shown as being added in consecutive order in the plan 340, this need not be the case. For instance, each step 322 may be collectively treated for insertion into the plan 340 as a block or may be individually treated with respect to amending the plan 340 such that individual ones of the steps 322 may be inserted at different respective locations in the plan 340. As shown in FIG. 3, Step A 332a may be made the active step. In this regard, it may be that Step 1 330a has yet to end, in which case Step 1 330a may be suspended or temporarily halted until execution of one or more other steps 322 complete or end.

Such amendments to the plan may occur at different levels of the hierarchical dialog structure shown in FIG. 3. For instance, during execution of Step A 330a, an input 352 may be received. The input 352 may be text, speech, utterance, or other input of "what's the weather like in Seattle." The input 352 may comprise a modifying trigger. For instance, the input 352 may be an unexpected input for Step A 330a. An unexpected input may be an input that does not satisfy a prompt; is not a correct variable form; corresponds to an intent, entity, or event different than that of the current rule; or includes some other indication that a condition has changed such that the active dialog and/or step are no longer immediately relevant to the user. For instance, the input 352 of "what's the weather like in Seattle" may indicate that the user's intent has changed from the intent associated with the "bookFlight" conversational rule 322. In this regard, the input 352 may invoke a consultation in which the recognizer 312 may determine if any rules in the active dialog 302 correspond with the modified trigger of the input 352. If no rule 322 in the active dialog 302 corresponds with the modified trigger of the input 352, the consultation may extend to the parent dialog, which in this case is the root dialog 300. In turn, the recognizer 310 of the root dialog 300 may determine if any conversational rules 320 in the root dialog 300 correspond to the modifying trigger. For instance, the input 352 may comprise a modifying trigger related to the intent "weather." A conversational rule 324 corresponding to the intent "weather" may be identified by the adaptive dialog 300 from the conversational rules of the adaptive dialog 300.

Figure 4:
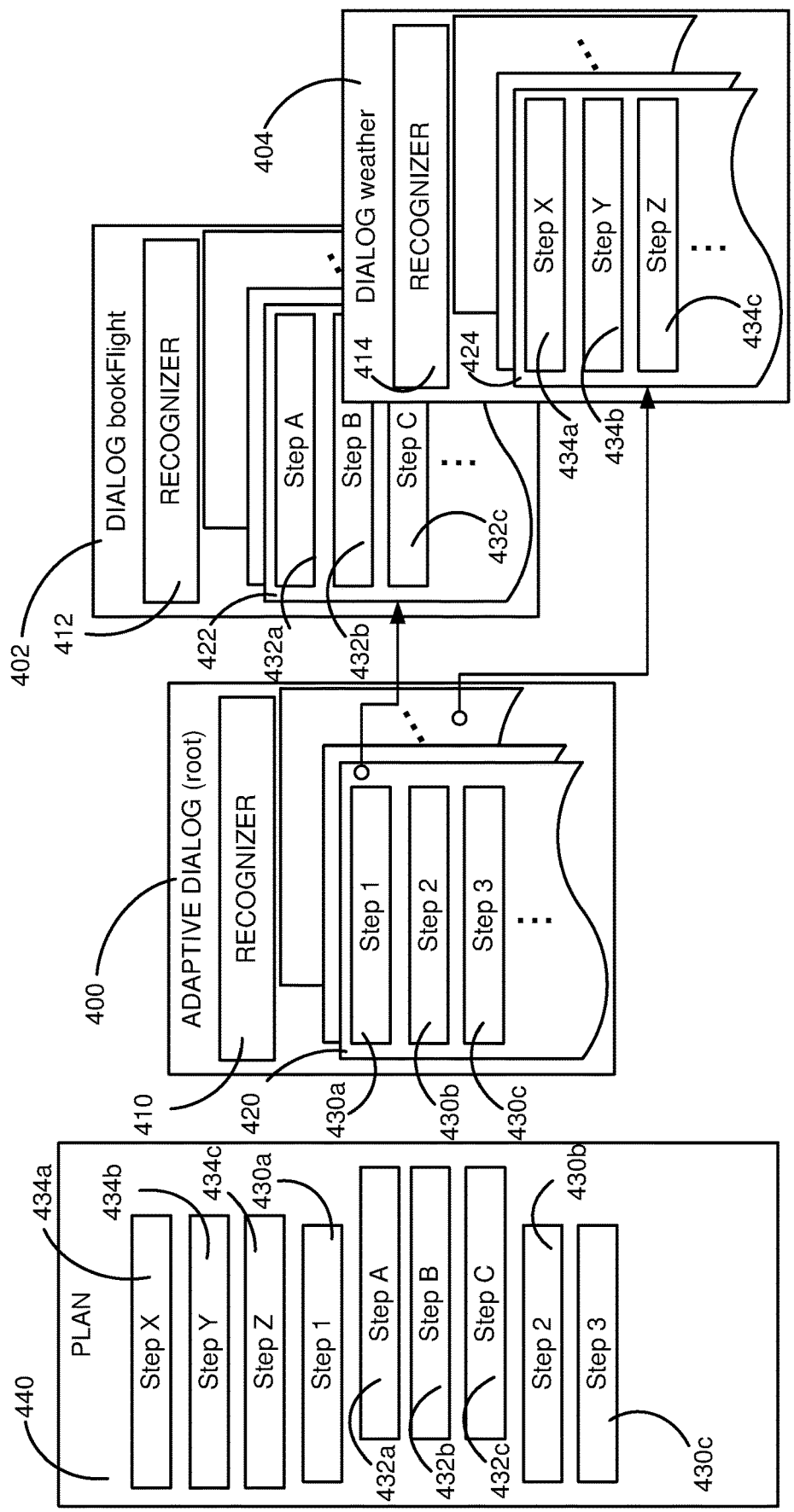
FIG. 4 illustrates an example of handling a modifying trigger received at a conversational system employing an adaptive dialog.

In turn, with further reference to FIG. 4, an example of an amendment to a plan 440 maintained in a memory of a conversational system by an adaptive dialog is shown. An adaptive dialog 400 may include one or more conversational rules 420, each of which may include one or more steps 430a, 430b, and/or 430c. In this regard, the plan 440 may be populated with steps 430a, 430b, and 430c from the conversational rule 420 of the adaptive dialog 400. A child dialog 402 may be called during execution of a step 430a. As each step 430 may itself comprise a dialog, execution of step 430a may call dialog 402. Dialog 402 may comprise a conversational rule 422. The conversational rule 422 may include one or more steps 432a, 432b, 432c. As the dialog 402 is called and the conversational rule 422 is invoked, steps 432a, 432b, and 432c may be added to the plan 440. For instance, conversational rule 422 may be associated with an intent of an input by the user.

However, during execution of the rule 422, a modifying trigger may be received, which may result in identification of another conversational rule 424 of another dialog 404. For instance, a weather conversational rule 424 may be called by the adaptive dialog 400. In turn, steps for the rule 424 corresponding to dialog 404 may include Step X 434a, Step Y 434b, and Step Z 434c. In turn, Step X 434a, Step Y 434b, and Step Z 434c may be added to a plan 440. As described above, a rule 424 may amend the plan 440 in any manner. For instance, Step X 434a, Step Y 434b, and Step Z 434c may be added to the beginning of the plan 440. Moreover, others of the steps in the plan 440 may be suspended. Upon completion of the Step X 434, Step Y 434b, and Step Z 434c associated with the weather conversational rule 424, the plan 440 may return to the suspended steps.

Figure 5:
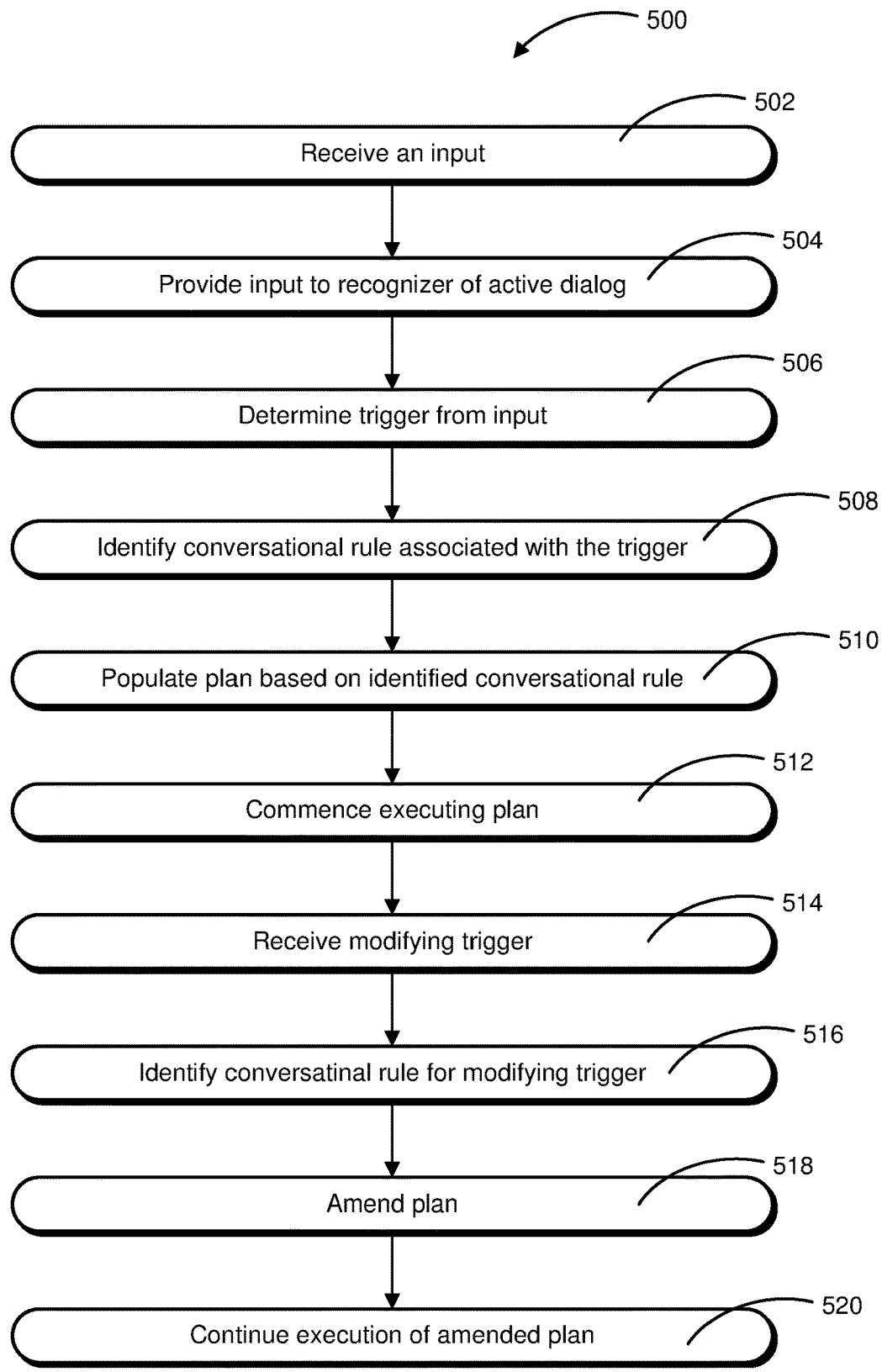
FIG. 5 illustrates example operations for dynamically modifying a conversation structure of a computer-executed conversational system.

FIG. 5 illustrates example operations 500 for dynamically modifying a conversation structure of a computer-executed conversational system. A receiving operation 502 receives an input. As described above, an input may comprise a user input or other event (e.g., a system event or the like). A providing operation 504 provides the input to a recognizer of an active dialog. The recognizer may process the input and a determining operation 506 may determine a trigger based on the input.

In turn, an identifying operation 508 may identify a conversational rule associated with the trigger determined in the determining operation 506. A populating operation 510 may populate a plan based on the conversational rules identified in the identifying operation 508. For instance, the populating operation 510 may include adding steps from the identified conversational rule to the plan in any manner, removal of steps from the plan, and/or modification of steps in the plan without limitation. A commencing operation 512 commences operation of the plan 140.

A receiving operation 514 may receive a modifying trigger. The receiving operation 514 may occur in conjunction with an active step of the plan or may comprise another input such as a system event or the like. Of note, the plan need not have completed execution prior to the receiving operation 514. As such, the receiving operation 514 in which the modifying trigger is received may correspond to an interruption, an aside, and/or a tangent in the conversation initiated by the user or the system. In any regard, an identifying operation 516 may identify a conversational rule associated with the modifying trigger received in the receiving operation 514. In turn, an amending operation 518 may amend the plan. In turn, a continuing operation 520 may continue execution of the amended plan.

Figure 6:
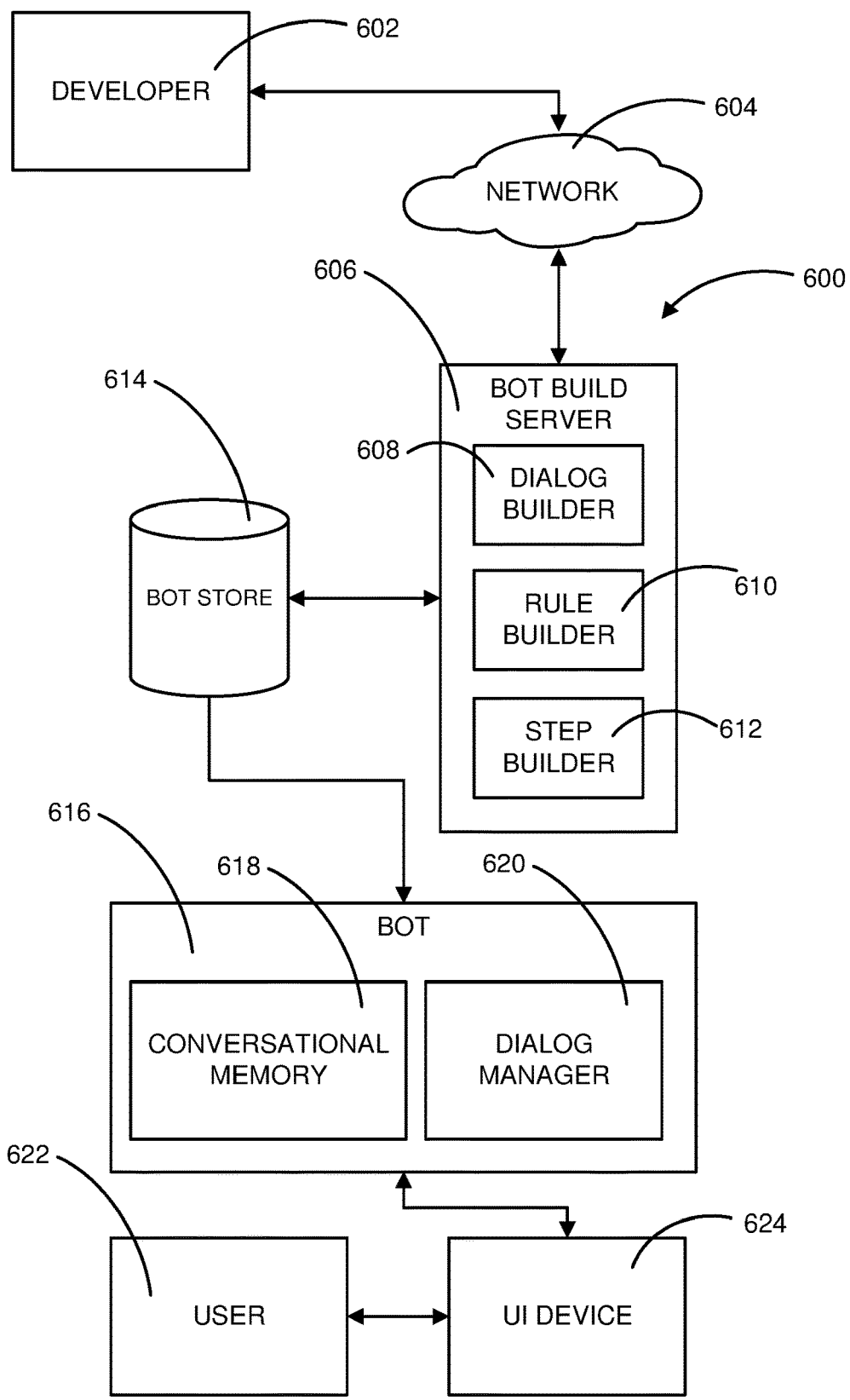
FIG. 6 illustrates an example computing system including a bot building server platform for designing and publishing bots according to examples described herein.

FIG. 6 is a simplified block diagram of a computing system 600 including a bot building server platform 606 for designing and publishing bots in an example. As illustrated in FIG. 6, developers 602 may use computing devices, such as general computing devices, tablet computing devices, mobile computing device, or the like, to access the bot building server platform 606 via network 604, which may be the Internet, a local network, a wide area network, or the like. In sample embodiments, the bot building server platform 606 includes dialog building platform 608 for creating dialogs for respective applications implementing the created bot. The bot building server platform 606 may also include a rule building platform 610 for creating rules as described above including a condition and steps to execute. The bot building server platform 606 may also include a step building platform 612 for creating steps that execute functionality as described above. In this regard, the bot building server platform 606 may provide declarative file components for generation of dialogs, rules, and/or steps. This may allow developers to easily develop bots by plugging predefined or populatable elements from the bot building server platform 606. For instance, the declarative file formats may comprise a schema (e.g., XML, JSON, etc.) that provides structure for developing dialogs, rules, and/or steps. In this regard, the dialogs, rules, and/or steps may further be extensible by a developer 602. The bot building server platform 606 provides an appropriate schema to dialog building platform 608, rule building platform 610, and step building platform 612 to create the desired dialogs for the bots being created by the developers. The created bots are stored in bot store 614 for publishing to different bot communication channels for interaction with users 622 via a user interface device 624 as described above. For example, the communication channels for the bot dialog may include directory services, a web portal, mailbox services, instant message stores, social networking services, virtual assistants, and other services that may implement dialogs via bots. The bot 616 so created and published may be a bot of the type described above. The bot 616 may include a dialog manager 620, which may maintain the plan of the conversational system. The bot 616 may also include a conversational memory 618. Content provided by users when interacting with the bot 616 may be stored in the conversational memory 618 for processing by the dialog manager 620. By way of example, the bot building server platform 606 may be implemented in a general computing device.

Figure 7:
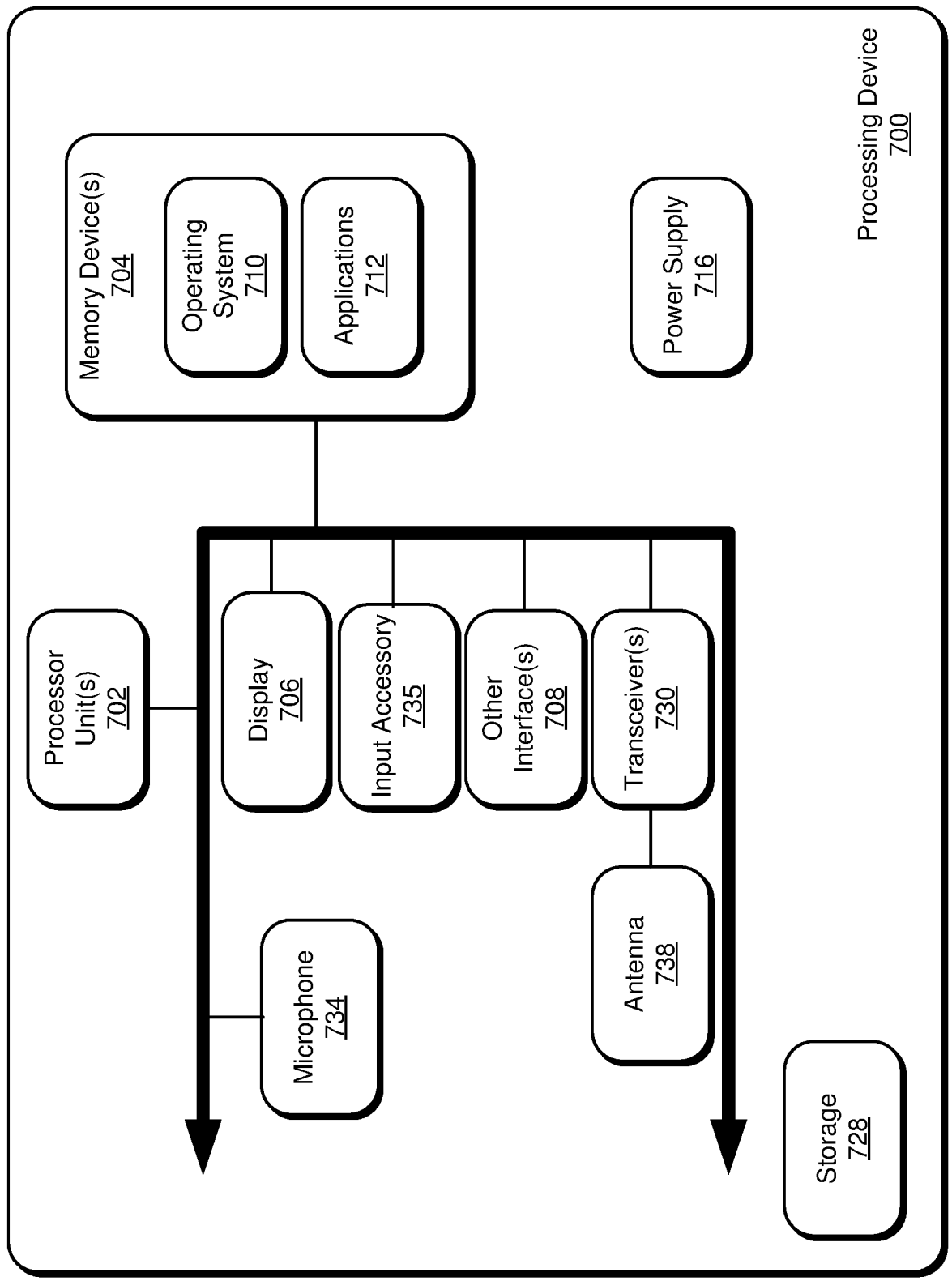
FIG. 7 illustrates an example schematic of a processing device suitable for implementing aspects of the disclosed technology.

FIG. 7 illustrates an example schematic of a processing device 700 suitable for implementing aspects of the disclosed technology. The processing device 700 includes one or more processor unit(s) 702 (e.g., hardware processor unit(s)), memory 704, a display 706, and other interfaces 708 (e.g., buttons). The memory 704 may generally include both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processor unit(s) 702, although it should be understood that other operating systems may be employed.

One or more applications 712 are loaded in the memory 704 and executed on the operating system 710 by the processor unit(s) 702. Applications 712 may receive input from various input local devices such as a microphone 734, input accessory 735 (e.g., keypad, mouse, stylus, touchpad, gamepad, racing wheel, joystick). Additionally, the applications 712 may receive input from one or more remote devices such as remotely-located smart devices by communicating with such devices over a wired or wireless network using more communication transceivers 730 and an antenna 738 to provide network connectivity (e.g., a mobile phone network, Wi-Fi®, Bluetooth®). The processing device 700 may also include various other components, such as a positioning system (e.g., a global positioning satellite transceiver), one or more accelerometers, one or more cameras, an audio interface (e.g., the microphone 734, an audio amplifier and speaker and/or audio jack), and storage devices 728. Other configurations may also be employed.

The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

In an example implementation, a global provisioning service, smart hub, or smart device firmware may include hardware and/or software embodied by instructions stored in the memory 704 and/or the storage devices 728 and processed by the processor unit(s) 702. The memory 704 may be the memory of a host device or of an accessory that couples to the host.

In view of the foregoing, any of the foregoing examples may be executed on the processing device 700. The processing device 700 may include a variety of tangible processor-readable storage media and intangible processor-readable communication signals. Tangible processor-readable storage can be embodied by any available media that can be accessed by the processing device 700 and may include both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of dynamically modifying a conversation structure of a computer-executed conversational system executed by one or more processors using an adaptive dialog, the method including: recognizing a trigger by an adaptive dialog recognizer of the adaptive dialog. The method also includes identifying a conversational rule of the adaptive dialog that is associated with the trigger. The method also includes launching a plan by the computer-executed conversational system, the plan being populated with a sequence of one or more steps for the conversational rule. The method also includes commencing execution of the sequence of one or more steps of the plan by the one or more processors of the computer-executed conversational system. The method also includes receiving a modifying trigger during an active step in the sequence of one or more steps, where the modifying trigger is associated with another conversational rule. The method also includes amending the plan based on the modifying trigger at least to add a step to the plan or remove a step from the plan in any location within the sequence of one or more steps of the plan. Other embodiments of this aspect include corresponding computer systems, apparatus, and computer programs recorded on one or more computer storage devices, each configured to perform the actions of the methods.

Implementations may include one or more of the following features. The method where the trigger includes at least one of an intent, entity, or event. The method further including: receiving the modifying trigger at a recognizer for the active step, where the modifying trigger includes an unexpected value for the active step. The method where each step in the plan includes a dialog, and where at least one of the steps includes an adaptive dialog. The method where the modifying trigger includes a modified intent different than an intent of the trigger for a dialog, and where the plan is modified to launch an intervening dialog corresponding to the modified intent in response to receipt of the modifying trigger, the method further including: returning to the dialog associated with the trigger upon completion of the intervening dialog. The method where the conversational rules and the one or more steps include declarative file components of a software development kit for structuring the adaptive dialog. The method where at least one step of the plan accepts an input including a wrapper around a prompt at that is used to ask for and collect information from a user to write the information to memory. Implementations of the described techniques may include hardware, a method or process, or computer software on a computer-accessible medium.

One general aspect includes one or more tangible processor-readable storage media embodied with instructions for executing on one or more processors and circuits of a device a process for dynamically modifying a conversation structure of a computer-executed conversational system executed by one or more processors using an adaptive dialog, the process including: recognizing a trigger by an adaptive dialog recognizer of the adaptive dialog. The one or more tangible processor - readable storage media also includes identifying a conversational rule of the adaptive dialog that is associated with the trigger. The one or more tangible processor - readable storage media also includes launching a plan by the computer-executed conversational system, the plan being populated with a sequence of one or more steps for the conversational rule. The one or more tangible processor - readable storage media also includes commencing execution of the sequence of one or more steps of the plan by the one or more processors of the computer-executed conversational system. The one or more tangible processor - readable storage media also includes receiving a modifying trigger during an active step in the sequence of one or more steps, where the modifying trigger is associated with another conversational rule. The one or more tangible processor - readable storage media also includes amending the plan based on the modifying trigger at least to add a step to the plan or remove a step from the plan in any location within the sequence of one or more steps of the plan.

Implementations may include one or more of the following features. The one or more tangible processor-readable storage media where the trigger includes at least one of an intent, entity, or event. The one or more tangible processor-readable storage media where the process further includes: receiving the modifying trigger at a recognizer for the active step, where the modifying trigger includes an unexpected value for the active step. The one or more tangible processor-readable storage media where each step in the plan includes a dialog, and where at least one of the steps includes an adaptive dialog. The one or more tangible processor-readable storage media where the modifying trigger includes a modified intent different than an intent of the trigger of a dialog, and where the plan is modified to launch an intervening dialog corresponding to the modified intent in response to receipt of the modifying trigger, the process further including: returning to the dialog associated with the trigger upon completion of the intervening dialog. The one or more tangible processor-readable storage media where the conversational rules and the one or more steps include declarative file components of a software development kit for structuring the adaptive dialog. The one or more tangible processor-readable storage media where at least one step of the plan accepts an input including a wrapper around a prompt at that is used to ask for and collect information from a user to write the information to memory.

One general aspect includes a system including: one or more processors. The system also includes a recognizer executed by the one or more processors to recognize a trigger. The system also includes an adaptive dialog executed by the one or more processors to identify a conversational rule of the adaptive dialog that is associated with the trigger and populate a plan with a sequence of one or more steps for the conversational rule, where the one or more processors commence execution of the sequence of one or more steps of the plan. The system also includes where the adaptive dialog is operative to receive a modifying trigger associated with another conversational rule during an active step in the sequence of one or more steps and amend the plan based on the modifying trigger at least to add a step to the plan or remove a step from the plan in any location within the sequence of one or more steps of the plan.

Implementations may include one or more of the following features. The system where the trigger includes at least one of an intent, entity, or event. The system where each step in the plan includes a dialog, and where at least one of the steps includes an adaptive dialog. The system where the modifying trigger includes a modified intent different than an intent of the trigger of a dialog, and where the adaptive dialog amends the plan is launch an intervening dialog corresponding to the modified intent in response to receipt of the modifying trigger and returns to the dialog associated with the trigger upon completion of the intervening dialog. The system where the conversational rules and the one or more steps include declarative file components of a software development kit for structuring the adaptive dialog. The system where at least one step of the plan accepts an input including a wrapper around a prompt at that is used to ask for and collect information from a user to write the information to memory.

One general aspect includes a system for dynamically modifying a conversation structure of a computer-executed conversational system executed by one or more processors using an adaptive dialog. The system includes a means for recognizing a trigger by an adaptive dialog recognizer of the adaptive dialog. The system also includes a means for identifying a conversational rule of the adaptive dialog that is associated with the trigger. The system includes a means for launching a plan by the computer-executed conversational system, the plan being populated with a sequence of one or more steps for the conversational rule. The system also includes a means for commencing execution of the sequence of one or more steps of the plan by the one or more processors of the computer-executed conversational system and a means for receiving a modifying trigger during an active step in the sequence of one or more steps. The modifying trigger is associated with another conversational rule. The system also includes a means for amending the plan based on the modifying trigger at least to add a step to the plan or remove a step from the plan in any location within the sequence of one or more steps of the plan. Implementations of this aspect may include one or more of the features described in relation to the foregoing aspects.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of dynamically modifying a conversation structure of a computer-executed conversational system executed by one or more processors using an adaptive dialog, the method comprising:
    recognizing a trigger by an adaptive dialog recognizer of the adaptive dialog;
    identifying a conversational rule of the adaptive dialog that is associated with the trigger;
    launching a plan by the computer-executed conversational system, the plan being populated with a sequence of one or more steps for the conversational rule;
    commencing execution of the sequence of one or more steps of the plan by the one or more processors of the computer-executed conversational system;
    receiving a modifying trigger including an unexpected input during an active step in the sequence of one or more steps, wherein the modifying trigger is associated with another conversational rule; and
    amending the plan based on the modifying trigger at least to add a step to the plan or remove a step from the plan in any location within the sequence of one or more steps of the plan.

2. The method of claim 1, wherein the trigger comprises at least one of an intent, entity, or event.

3. The method of claim 1, further comprising:
    receiving the modifying trigger at a recognizer for the active step.

4. The method of claim 1, wherein each step in the plan comprises a dialog, and wherein at least one of the steps comprises an adaptive dialog.

5. The method of claim 1, wherein the modifying trigger comprises a modified intent different than an intent of the trigger for a dialog, and wherein the plan is modified to launch an intervening dialog corresponding to the modified intent in response to receipt of the modifying trigger, the method further comprising:
    returning to the dialog associated with the trigger upon completion of the intervening dialog.

6. The method of claim 1, wherein the conversational rules and the one or more steps comprise declarative file components of a software development kit for structuring the adaptive dialog.

7. The method of claim 1, wherein at least one step of the plan accepts an input comprising a wrapper around a prompt at that is used to ask for and collect information from a user to write the information to memory.

8. The method of claim 1, wherein the modifying trigger is unrelated to the previously recognized trigger.

9. One or more tangible processor-readable storage media embodied with instructions for executing on one or more processors and circuits of a device a process for dynamically modifying a conversation structure of a computer-executed conversational system executed by one or more processors using an adaptive dialog, the process comprising:
- recognizing a trigger by an adaptive dialog recognizer of the adaptive dialog;
- identifying a conversational rule of the adaptive dialog that is associated with the trigger;
- launching a plan by the computer-executed conversational system, the plan being populated with a sequence of one or more steps for the conversational rule;
- commencing execution of the sequence of one or more steps of the plan by the one or more processors of the computer-executed conversational system;
- receiving a modifying trigger including an unexpected input during an active step in the sequence of one or more steps, wherein the modifying trigger is associated with another conversational rule; and
- amending the plan based on the modifying trigger at least to add a step to the plan or remove a step from the plan in any location within the sequence of one or more steps of the plan.

10. The one or more tangible processor-readable storage media of claim 9, wherein the trigger comprises at least one of an intent, entity, or event.

11. The one or more tangible processor-readable storage media of claim 9, wherein the process further comprises:
- receiving the modifying trigger at a recognizer for the active step.

12. The one or more tangible processor-readable storage media of claim 9, wherein each step in the plan comprises a dialog, and wherein at least one of the steps comprises an adaptive dialog.

13. The one or more tangible processor-readable storage media of claim 9, wherein the modifying trigger comprises a modified intent different than an intent of the trigger of a dialog, and wherein the plan is modified to launch an intervening dialog corresponding to the modified intent in response to receipt of the modifying trigger, the process further comprising:
- returning to the dialog associated with the trigger upon completion of the intervening dialog.

14. The one or more tangible processor-readable storage media of claim 9, wherein the conversational rules and the one or more steps comprise declarative file components of a software development kit for structuring the adaptive dialog.

15. The one or more tangible processor-readable storage media of claim 9, wherein at least one step of the plan accepts an input comprising a wrapper around a prompt at that is used to ask for and collect information from a user to write the information to memory.

16. The one or more tangible processor-readable storage media of claim 9, wherein the modifying trigger is unrelated to the previously recognized trigger.

17. A system comprising:
- one or more processors;
- a recognizer executed by the one or more processors to recognize a trigger;
- an adaptive dialog executed by the one or more processors to identify a conversational rule of the adaptive dialog that is associated with the trigger and populate a plan with a sequence of one or more steps for the conversational rule, wherein the one or more processors commence execution of the sequence of one or more steps of the plan; and
- wherein the adaptive dialog is operative to receive a modifying trigger including an unexpected input associated with another conversational rule during an active step in the sequence of one or more steps and amend the plan based on the modifying trigger at least to add a step to the plan or remove a step from the plan in any location within the sequence of one or more steps of the plan.

18. The system of claim 17, wherein the trigger comprises at least one of an intent, entity, or event.

19. The system of claim 17, wherein each step in the plan comprises a dialog, and wherein at least one of the steps comprises an adaptive dialog.

20. The system of claim 17, wherein the modifying trigger comprises a modified intent different than an intent of the trigger of a dialog, and wherein the adaptive dialog amends the plan is launch an intervening dialog corresponding to the modified intent in response to receipt of the modifying trigger and returns to the dialog associated with the trigger upon completion of the intervening dialog.

21. The system of claim 17, wherein the conversational rules and the one or more steps comprise declarative file components of a software development kit for structuring the adaptive dialog.

22. The system of claim 17, wherein at least one step of the plan accepts an input comprising a wrapper around a prompt at that is used to ask for and collect information from a user to write the information to memory.

23. The system of claim 17, wherein the modifying trigger is unrelated to the previously recognized trigger.

* * * * *